(12) United States Patent
Martin et al.

(10) Patent No.: US 6,438,006 B1
(45) Date of Patent: Aug. 20, 2002

(54) MINIATURE, HIGH VOLTAGE, LOW RIPPLE, HIGH EFFICIENCY, HIGH RELIABILITY, DC TO DC CONVERTER

(75) Inventors: Hubert C. Martin, Sandy; Robert H. Peterson, Salt Lake City; Kevin K. Liu, Sandy; Steven W. Wiscomb, Salt Lake City; Larry N. Mercer, Bountiful; Matthew R. Reed; Parry L. Cowdell, both of West Jordan, all of UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/668,939

(22) Filed: Sep. 25, 2000

(51) Int. Cl.$^7$ .............................................. H02M 7/758
(52) U.S. Cl. .......................................... 363/61; 363/65
(58) Field of Search ............................. 363/40, 41, 46, 363/59, 60, 61, 65, 67, 69, 70, 71

(56) References Cited

U.S. PATENT DOCUMENTS

| 4,199,805 A | * | 4/1980 | Martinelli et al. ............. 363/60 |
| 5,764,501 A | * | 6/1998 | Limpaecher .................. 363/61 |
| 6,118,678 A | * | 9/2000 | Limpaecher et al. .......... 363/60 |

* cited by examiner

*Primary Examiner*—Jessica Han
(74) *Attorney, Agent, or Firm*—Perman & Green, LLP

(57) ABSTRACT

A voltage multiplying circuit including a multiphase power stage and at least one phased voltage multiplier stage connected to the multiphase power stage.

21 Claims, 6 Drawing Sheets

MINIATURE, HIGH VOLTAGE, LOW RIPPLE, HIGH EFFICIENCY, HIGH RELIABILITY, DC TO DC CONVERTER

The U.S. Government has a paid-up license in this invention and the right in limited circumstances to require the patent owner to license others on reasonable terms as provided for by the terms of contract number FO9604-98-C-0011 awarded by United States Air Force.

BACKGROUND OF THE INVENTION

1. Field of the Invention

The present invention relates to voltage multiplier circuits and more particularly to DC to DC converters.

2. Prior Art

Voltage multipliers typically require a pre-regulated input voltage and multiple stacked transformer windings. Most high voltage designs (above 10 kv) use a combination of single-phase transformers and multipliers which generally require heavy magnetic elements with labor intensive windings and potting. Also, voltage multipliers generating high voltages typically require coatings to prevent arcing between components. In addition, high voltage power supply designs generally use hermetically sealed semiconductors and polarized capacitor components; where in practice the capacitors and diodes in a high voltage power supply dissipate large amounts of heat leading to hot spots within the sealing coat causing component failure. Consequently, many high voltage power supply designs are designed on the basis of short mean time to repair (MTTR) versus low mean between failures (MTBF) and are only about 90% efficient. The other 10% is lost as heat lastly, because most packaging sub-assemblies of high voltage power supplies are cubic in shape, i.e., non-planar, they require expensive mechanical assembly techniques.

SUMMARY OF THE INVENTION

In accordance with one embodiment of the present invention, a voltage multiplying circuit, comprising a multiphase power stage and at least one phased voltage multiplier stage connected to the multiphase power stage.

In accordance with one method of the present invention a method for providing a high voltage power supply. The method comprising the steps of providing a multi-phased power stage and providing at least one multi-phased voltage multiplier stage connected to the multi-phase power stage.

In accordance with a second method of the present invention a method for generating high voltage. The method comprising steps of providing a plurality of multi-phased voltages and providing at least one multi-phase multiplier stage. Then connecting the plurality of multi-phased voltages to at least one multi-phase multiplier stage.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
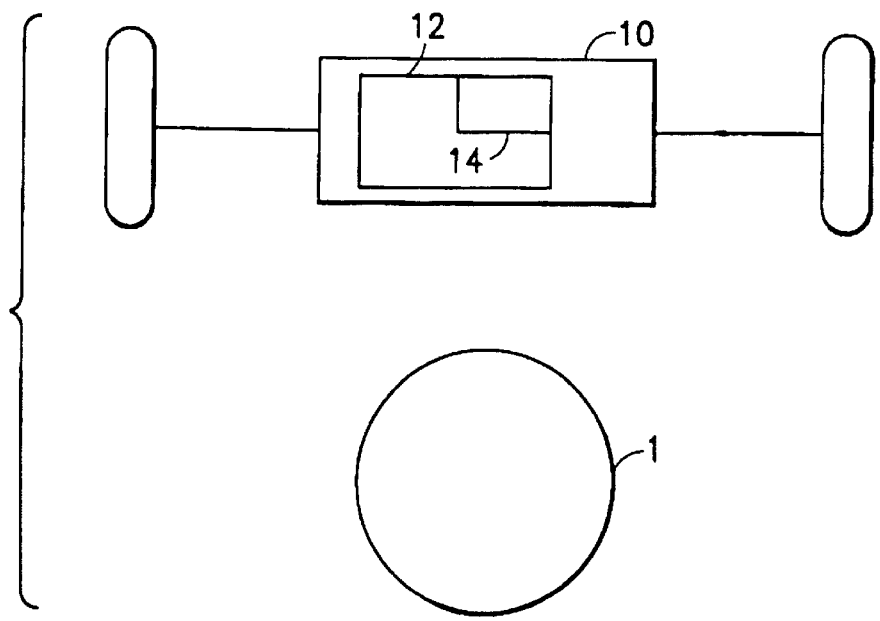
FIG. 1 illustrates a high altitude platform such as a satellite employing a laser based system requiring a high voltage multiplier.
Figure 2:
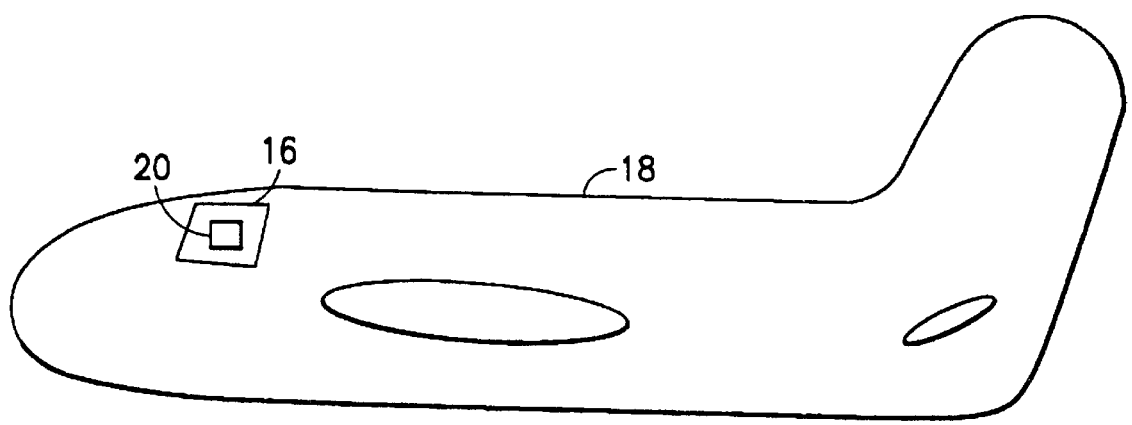
FIG. 2 illustrates a low altitude platform such as a military reconnaissance aircraft employing a cathode ray tube requiring a high voltage multiplier.

Reference is first made to FIG. 1 for illustrating a high altitude platform 10, such as but not limited to a high altitude satellite, and FIG. 2 for illustrating a low altitude platform 18, such as a military reconnaissance aircraft. Features of the present invention can be used in these types of platforms. Alternatively, features of the present invention could be used in any suitable type of electrical device where high DC voltages are required. For example, the present invention relates to high voltage DC power supplies generally used in television cathode ray tubes (CRTs), lasers, x-ray systems, travelling wave tubes (TWTs), ion pumps, electrostatic systems, copy machines, medical systems, and portable devices such as, but not Limited to, stun guns, and crowd control devices. More particularly, the present invention relates to light weight, miniaturized, high voltage multipliers used in applications where light weight, and high reliability high voltage DC power supplies are required, such as commercial and military aircraft and satellites. Referring now to FIG. 1 showing a high altitude satellite 10 in orbit around the planet 1. The high altitude satellite 10 generally includes a laser sub-system 12 which is assumed to include a high voltage DC power supply 14. The low altitude aircraft 18 shown in FIG. 2 can comprise a display 16 such as a cathode ray tube which is also assumed to include a high voltage DC power supply 20.

Figure 3:
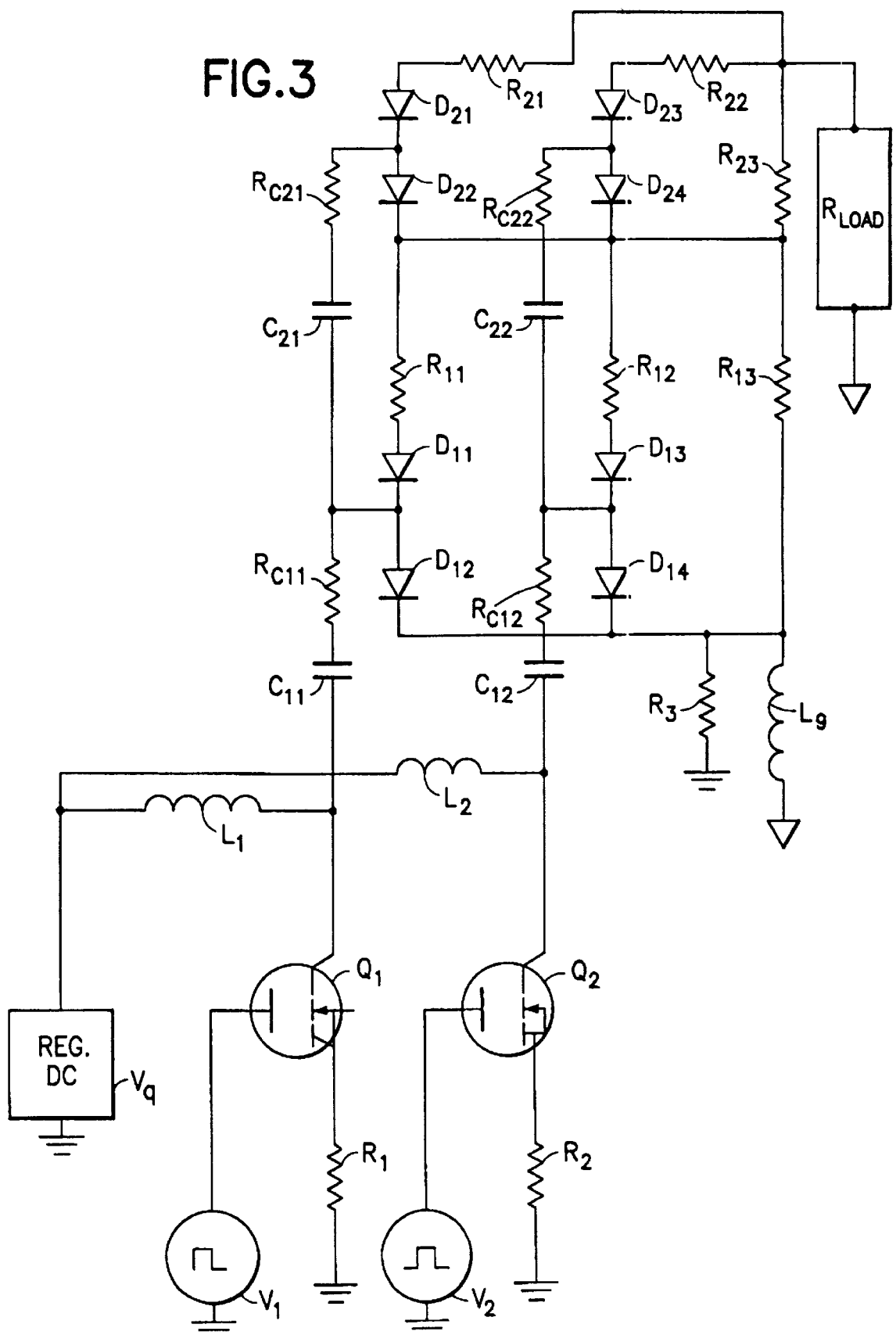
FIG. 3 is a schematic diagram of two segments of the multi-phase power stage of the preferred embodiment of the invention and two stages of the multi-phase voltage multipliers, each stage having two segments.

Referring to FIG. 3, there is shown a high voltage DC power supply circuit diagram incorporating features of the present invention. Components $V_1, V_2, V_q, R_1, R_2, Q_1, Q_2, L_1$, and $L_2$ form two segments of the multiphase power stage providing current and ground isolation for the phased voltage multiplier stages. Components $D_{11}-D_{14}, R_{11}-R_{13}, R_{c11}, R_{c12}, C_{11}$, and $C_{12}$ form two segments of the first phased voltage multiplier stage. Similarly, components $D_{21}-D_{24}, R_{21}-R_{23}, R_{c21}, R_{c22}, C_{21}$, and $C_{22}$ form two segments of the second phased voltage multiplier stage. Resistor $R_3$ provides a charging current path and inductor $L_9$ provides signal dampening. $R_{load}$ provides a load to the invention and is shown for illustration. Similarly, voltages $V_1, V_2$, and $V_q$ may be external to the circuit and are shown for illustration.

Figure 5:
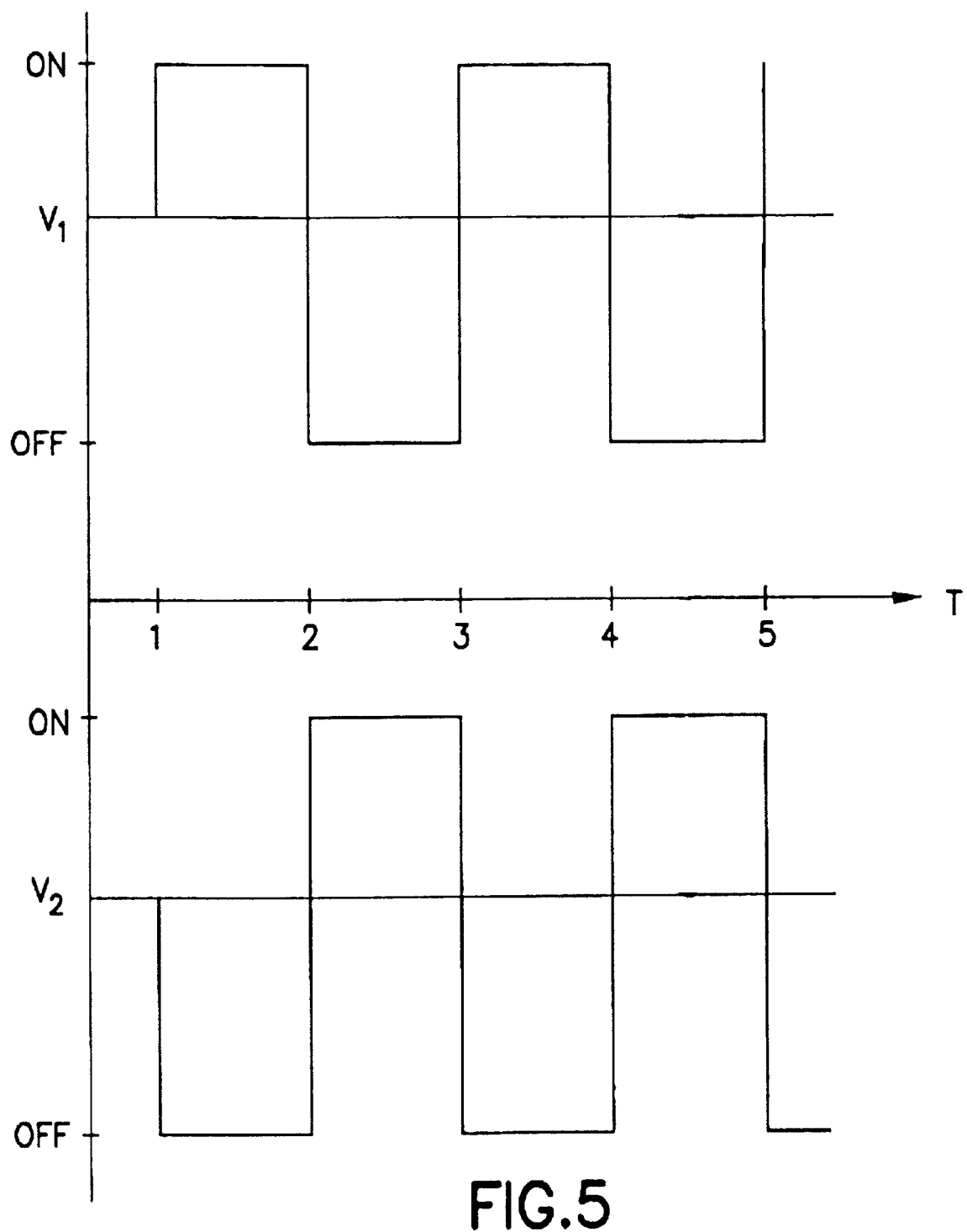
FIG. 5 is a waveform diagram showing the relative on/off states of $V_1$ and $V_2$.

Voltage source $V_q$ provides a regulated DC voltage. Voltage sources $V_1$ and $V_2$ provide alternately phased transistor bias voltages. Stated differently, when $V_1$, is on, $V_2$ is off as shown in FIG. 5. As seen with reference to FIG. 5, at time $T_1$, $V_1$ is on, turning transistor $Q_1$ on. With $Q_1$ on current will conduct along the circuit path $V_q - L_1 - Q_1 - R_1$ to ground. Inductor $L_1$, by the inherent action of an inductor, will attempt to oppose the change in the current path by generating a counter electromagnetic force (CEMF) equal to the voltage applied by $V_q$. However, the CEMF will begin to decay at a rate determined by the resistor/inductor (RL) time constant for the current path. Concurrently the current through the inductor will begin to increase to a value ultimately limited by the DC resistance of $Q_1$ and resistor $R_1$. When $V_1$ reverses polarity at time $T_2$, $Q_1$ is biased to the off or non-conducting state. Inductor $L_1$ again attempts to oppose the change in current by reversal of the CEMF polarity. Capacitor $C_{11}$ inherently opposes the change in voltage but begins to charge to the applied voltage through diode $D_{12}$ and resistors $R_{c11}$ and $R_3$. Capacitor $C_{21}$ also begins to charge to the applied voltage through diode $D_{22}$ and resistors $R_3, R_{13}$, and $R_{c21}$.

At time $T_2$, transistor $Q_1$ is off and transistor $Q_2$ is on. Similar to the earlier description, inductor $L_2$ attempts to oppose the change in current by a CEMF equal and opposite to the applied voltage. The current through $L_2$, $Q_2$, and $R_2$, to ground builds as the CEMF force decays. At time $T_3$, $Q_2$ turns off. Inductor $L_2$ attempts to oppose the change in current by reversing the polarity of the CEMF. Capacitor $C_{12}$ opposes the change in voltage but begins to charge to the voltage through diode $D_{14}$ and resistors $R_{c12}$ and $R_3$. Capacitor $C_{22}$ also begins to charge to the applied voltage through diode $D_{24}$ and resistors $R_3, R_{13}$, and $R_{c22}$.

At subsequent times $T_N$, where N=5,7,9, the circuit operation is as described above for time $T_1$. Transistor $Q_1$ is turned on and current flows through $L_1$, $Q_1$, and $R_1$ to ground. However, after several iterations, $C_{11}$ and $C_{21}$ have been charged to the applied voltage $V_q$. Thus, when transistor $Q_1$ is turned on capacitors $C_{11}$ and $C_{21}$ begin to discharge current through the diode resistor pairs $D_{11}/R_{11}$ and $D_{21}/R_{21}$ and the respective stage resistors $R_{23}$ and $R_{13}$. Using Ohm's law, the output voltage for a stage is the discharging current times the stage resistance. The sum of the voltages across the stage resistors $R_{23}$ and $R_{13}$ is the output voltage seen by a load $R_{load}$. Note that while capacitors $C_{11}$ and $C_{21}$ are discharging, diodes $D_{12}$ and $D_{22}$ are reversed bias thus preventing current flow through the diodes.

At a subsequent time $T_M$, where M=4,6,8, . . . the circuit description is similar. Capacitors $C_{12}$ and $C_{22}$ begin to discharge current through diode resistor pairs $D_{23}/R_{22}$ and $D_{13}/R_{12}$ to the stage resistors $R_{23}$ and $R_{13}$, respectively. Similarly diodes $D_{14}$ and $D_{24}$ are reversed bias to prevent current flow through the diodes.

In summary, after several iterations the capacitors in each segment will have charged to the applied voltage $V_q$. During a multi-phase power stage segments on time, i.e., the transistor is biased on, the capacitors associated with that segment will begin to discharge current through the associated stage resistance as described above. The capacitors associated with the off segments recharge the current that was discharged during their discharge cycle.

A preferred embodiment of the invention provides low output ripple voltages. In general, undesirable ripple voltage on the output are caused by a capacitor's current discharge and is, in general, a function of the Resistance Capacitance (RC) time constant for the particular discharging capacitor (or capacitors) and its current discharge path. A low RC time constant indicates a faster discharge of the capacitor and a higher ripple voltage. Thus, a low resistance load $R_{load}$ in parallel with the stage resistors would result in a lower output resistance R seen by the discharging capacitor and would permit the capacitor to discharge at a faster rate during the capacitor's discharge cycle. By adding more parallel segments as required, the capacitance C is increased, thereby increasing the RC time constant and decreasing the undesirable ripple voltage.

Figures 4, 4A, 4B, 4C:
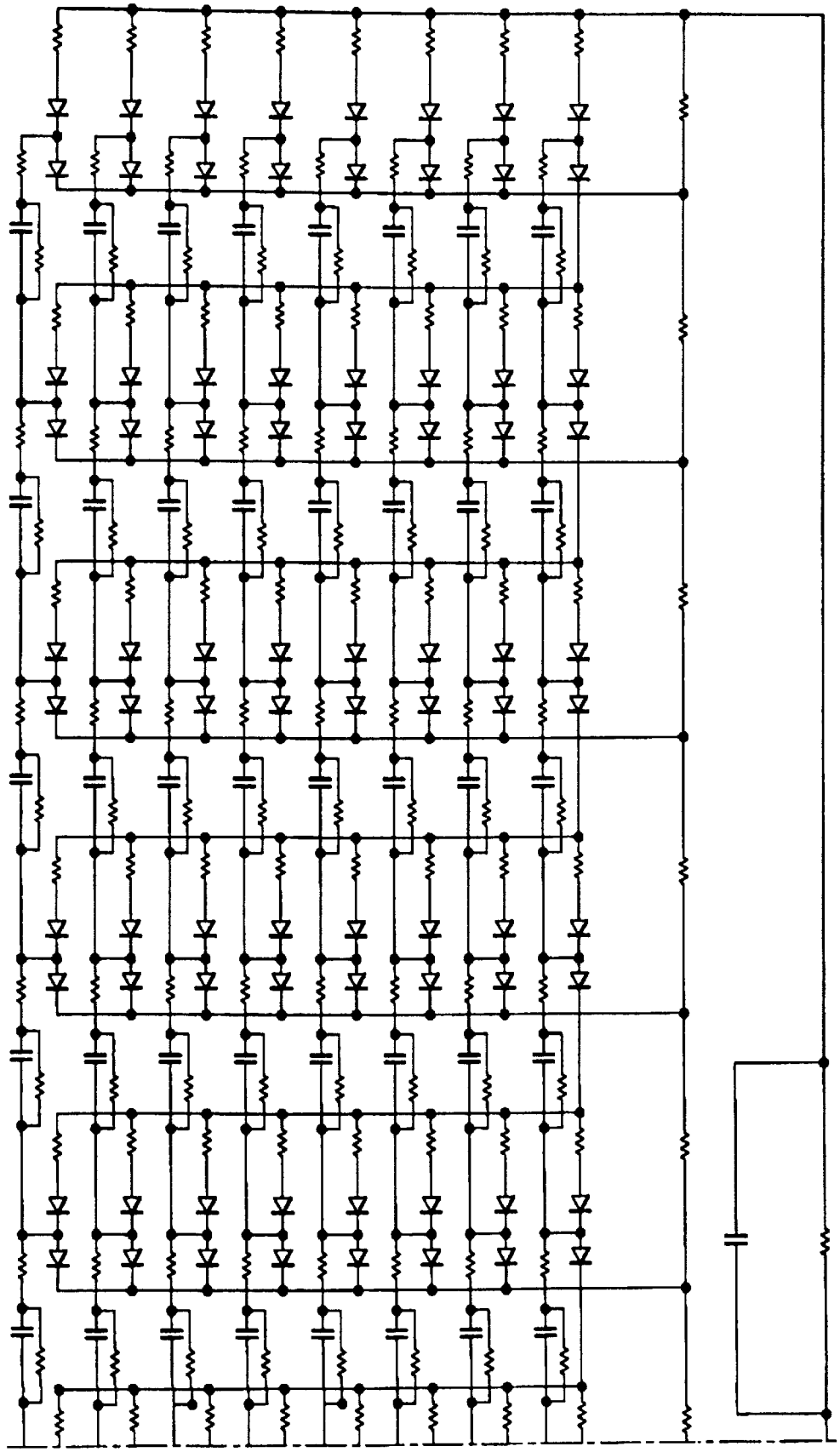
FIG. 4 is a schematic diagram of a preferred embodiment of the invention.
Figure 4B:
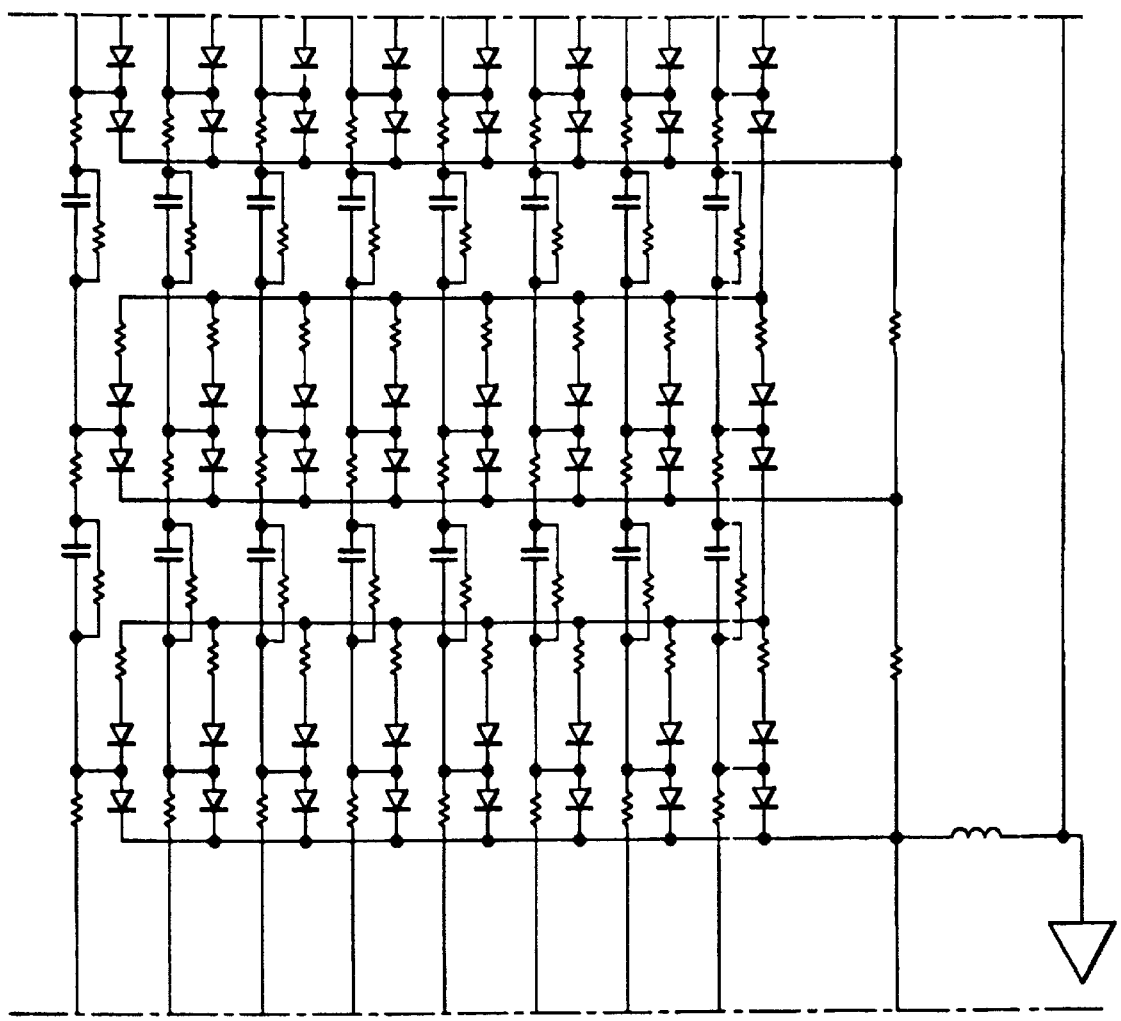
Figure 4C:
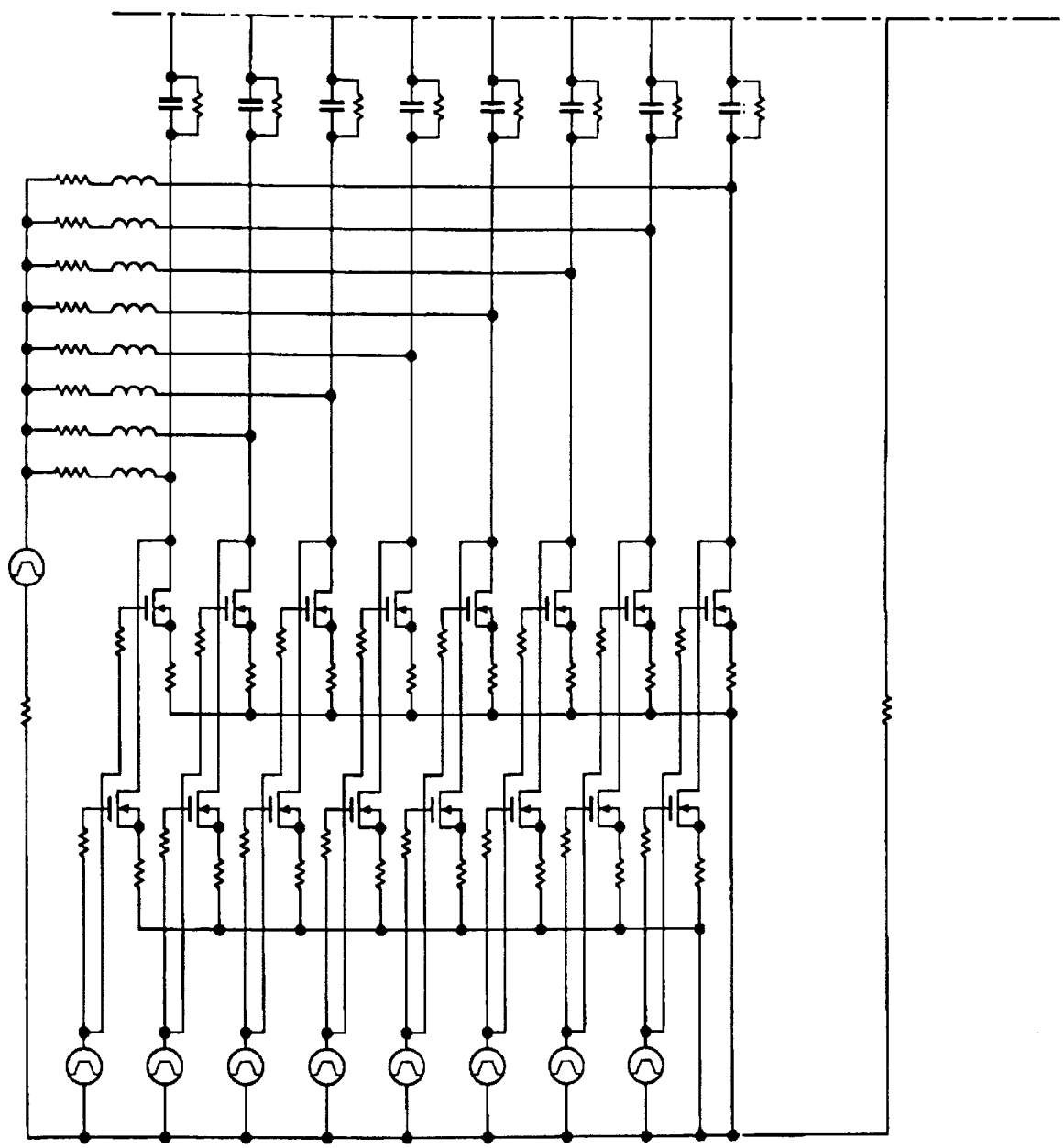

A preferred embodiment of the present invention provides an efficient and reliable high voltage DC power supply. Since each capacitor in the multiplier stages carries an equal amount of voltage, i.e., the input voltage and provide an equal amount of the output current, the need for special high current, high voltage capacitors is eliminated for most applications. By comparison, in a typical eight stage voltage multiplier the eighth stage capacitor would have eight times the input voltage, the seventh stage capacitor seven times the input voltage, and so on. The capacitor current drain is similarly multiplied thus requiring expensive and hermetically sealed high current capacitors as well as high current diodes. In addition, high current devices generally have inherent deficiencies due to the high current and resulting heat radiation. In a preferred embodiment of the present invention shown in FIG. 4, thirty two of the capacitors share the current load during the discharge cycle, eliminating the need for special high current capacitors and diodes. Thus, the preferred embodiment of this invention provides about a 97% efficiency since the current through the segments is not wasted as heat.

A preferred embodiment of the present invention provides a reliable high voltage DC power supply capable of extended mean times before failure of the supply. For example, assume for purposes of illustration that the bias voltage supplies $V_1$–$V_8$ are phased 45 degrees apart resulting in half of the transistors in the multi-phase power stage being on while the other half are off. As described above, the capacitors associated with the off voltage supplies are charging while the capacitors associated with on supplies are discharging and providing the output current. In this example of the preferred embodiment of the present invention there are thirty-two capacitors providing output current while the other thirty-two are charging. Thus, the failure of any one capacitor or segment will not result in the failure of the voltage multiplier circuit as a whole. By comparison, the failure of a stage in a typical DC voltage multiplier will result in the total failure of the typical DC voltage multiplier. Thus, an advantage of the preferred embodiment of the present invention is to provide a reliable high voltage DC power supply with a long mean time before failure of the supply It is also an advantage of this invention to provide a high voltage multiplier comprised of low cost and physically smaller components as compared to the higher cost and larger size of hermetically sealed and high voltage components. The smaller components permit the manufacture of the invention based on multi-layer circuit board assembly techniques requiring minimal mechanical design, lower material costs, shorter procurement lead times, and fewer errors in the build process.

It is also an advantage of this invention to provide a high voltage multiplier comprised of light weight components as compared to high voltage multipliers requiring heavy transformers with labor intensive windings and potting requirements. The comparatively light weight components permit the generation of high DC voltages while conserving payload space and weight.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims. For example, referring again to FIG. 3. In an alternate embodiment, or embodiments, the field effect transistors shown in FIG. 3 could be replaced by bipolar junction transistors or other devices performing a switching function. Similarly, the constant current source inductors and the voltage supply source could be replaced by a constant current source comprised of an operational amplifier and power supply. Likewise, the bias supply voltages could be replaced by suitable digital logic circuitry or programmable power supplies to finely control the duty cycle of a power stage segment to compensate for variances in component values or to turn segments on or off as required. Similarly, the charging and discharging diodes can be any suitable non-linear device such as a diode connected transistor.

What is claimed is:

1. A voltage multiplying circuit comprising:
   a mnultiphase power stage; and
   at least one phased voltage multiplier stage connected to the multiphase power stage;
   wherein the multiphase power stage comprises a plurality of phased power segments, wherein each phased power segment comprises:
   an inductor current source;
   at least one active device connected to the inductor current sources;
   a phased bias voltage source connected to the at least one active device; and
   a coupling capacitor connected to a junction of the at least one active device and the inductor current source.

2. A voltage multiplier circuit as in claim 1 wherein the at least one phased voltage multiplier stage comprises eight of the phased voltage multiplier stages.

3. A voltage multiplying circuit as in claim 1 wherein the plurality of phased power segments comprises eight of the phased power segments.

4. A voltage multiplying circuit as in claim 1 wherein the at least one active device comprises two field effect transistors (FET) connected in parallel.

5. A voltage multiplier circuit as in claim 1 wherein the at least one phased voltage multiplier stage comprises:
   at least one phased voltage multiplier segment wherein each voltage multiplier segment comprises:
   at least one non-linear device; and
   at least one storage device connected to the at least one non-linear device.

6. A voltage multiplying circuit as in claim 5 wherein the phased voltage multiplier segments comprise eight of the phased voltage multiplier segments connected in parallel.

7. A voltage multiplier circuit as in claim 5 wherein the at least one non-linear device comprises a series connected diode pair.

8. A voltage multiplier circuit as in claim 5 wherein the at least one storage device comprises a capacitor.

9. A method for manufacturing a high voltage power supply, the method comprising the steps of:
   providing a multi-phased power stage comprising a plurality of phased power segments, each phased power segment having an inductor current source;
   providing at least one multi-phased voltage multiplier stage; and
   connecting the at least one multi-phase voltage multiplier stage to the multi-phase power stage.

10. A method as in claim 9 wherein the step of providing the multi-phased power stage comprises:
    providing a plurality of inductor current sources;
    providing a plurality of active devices connected to the plurality of inductor current sources;
    providing a plurality of external phased voltages to bias ports of the plurality of active devices; and
    providing a plurality of phased currents from the plurality of inductor current sources to a first multi-phased voltage multiplier stage.

11. A method as in claim 10 wherein the step of providing a plurality of inductor current sources comprises:
    providing at least one external voltage;
    providing a plurality of inductors; and
    connecting the plurality of inductors to the at least one external voltage.

12. A method as in claim 9, wherein the step of providing the at least one multi-phased voltage multiplier stage comprises:
    providing a plurality of non-linear devices; and
    providing a plurality of storage devices connected to the plurality of non-linear devices.

13. A method as in claim 12 wherein the step of providing the plurality of non-linear device further comprises providing two series connected diodes.

14. A method as in claim 12 wherein the step of providing the plurality of storage devices further comprises providing a capacitor.

15. A method for generating high voltage, the method comprising steps of:
    providing a plurality of multi-phased voltages from phased power segments, each power segment having an inductor current source;
    providing at least one multi-phase multiplier stage; and
    connecting the plurality of multi-phased voltages to the at least one multi-phase multiplier stage.

16. A method as in claim 15 wherein the step of providing the plurality of multi-phased voltages comprises:
    providing a plurality of phased voltage segments wherein each phased voltage segment comprises:
    providing at least one current source;
    providing at least one active device;
    connecting the at least one current source to the at least one active device.

17. A method as in claim 16 wherein the step of providing the at least one current source comprises:
    providing at least one inductor;
    providing at least one external power source; and
    connecting the at least one inductor to the at least one external power source.

18. A method as in claim 16 wherein the step of providing the at least one active device comprises providing at least one field effect transistor (FET).

19. A method as in claim 15 wherein the step of providing the at least one multi-phase multiplier stage comprises:
    providing a plurality of phased voltage multiplier segments wherein each voltage multiplier segment comprises:
    providing at least one non-linear device;
    providing at least one storage device;
    connecting at least one diode to the at least one storage device, and
    connecting the plurality of phased voltage multiplier segments in parallel.

20. A method as in claim 19 wherein the step of providing the at least one non-linear device comprises providing two diodes connected in series.

21. A method as in claim 19 wherein the step of providing the at least one storage device comprises providing a capacitor.

* * * * *